(12) United States Patent
Yin et al.

(10) Patent No.: US 10,430,718 B2
(45) Date of Patent: Oct. 1, 2019

(54) AUTOMATIC SOCIAL MEDIA CONTENT TIMELINE SUMMARIZATION METHOD AND APPARATUS

(71) Applicant: OATH INC., New York, NY (US)

(72) Inventors: Dawei Yin, Santa Clara, CA (US); Jiliang Tang, San Jose, CA (US); Yi Chang, Sunnyvale, CA (US)

(73) Assignee: OATH INC., New York, NY (US)

( * ) Notice: Subject to any disclaimer, the term of this patent is extended or adjusted under 35 U.S.C. 154(b) by 614 days.

(21) Appl. No.: 15/200,922

(22) Filed: Jul. 1, 2016

(65) Prior Publication Data

US 2018/0005131 A1    Jan. 4, 2018

(51) Int. Cl.
    *G06N 7/00*       (2006.01)
    *G06Q 50/00*      (2012.01)
    *G06F 16/9535*    (2019.01)
    *G06N 20/00*      (2019.01)

(52) U.S. Cl.
    CPC ......... *G06N 7/005* (2013.01); *G06F 16/9535* (2019.01); *G06N 20/00* (2019.01); *G06Q 50/01* (2013.01)

(58) Field of Classification Search
    None
    See application file for complete search history.

(56) References Cited

U.S. PATENT DOCUMENTS

| | | | | |
|---|---|---|---|---|
| 2012/0136985 | A1* | 5/2012 | Popescu | G06Q 10/10 709/224 |
| 2016/0224672 | A1* | 8/2016 | Bindal | G06F 16/9535 |

OTHER PUBLICATIONS

Chua & Asur, Automatic Summarization of Events from Social Media, (2013) Proc. of the 7th Int'l AAAI Conference on Weblogs and Social Media, at p. 81-90 (Year: 2013).*

Ahmed & Xing, Scalable Dynamic Nonparametric Bayesian Models of Content and Users (2012), Proc. of the 23 Int'l Joint Conference on Artificial Intelligence at pp. 3111-3115 (Year: 2012).*

Chang et al., Ups and Downs in Buzzes: Life Cycle Modeling for Temporal Pattern Discovery (2014) IEEE Int'l Conference on Data Mining at p. 749-754 (Year: 2014).*

Meng et al., Entity-Centric Topic-Oriented Opinion Summarization in Twitter (2012), KDD'12 at pp. 379-387 (Year: 2012).*

(Continued)

*Primary Examiner* — Paulinho E Smith
(74) *Attorney, Agent, or Firm* — James J. DeCarlo; Greenberg Traurig, LLP

(57) ABSTRACT

Disclosed are systems and methods for improving interactions with and between computers in social media content generation and delivery and/or providing systems supported by or configured with personal computing devices, servers and/or platforms. The systems interact to identify and retrieve data within or across platforms, which can be used to improve the quality of data used in processing interactions between or among processors in such systems. The disclosed systems and methods provide systems and methods for automatically method for automatically summarizing social media content using a timeline comprising a set (or chain) of episodes and a summary of each episode. The disclosed systems and methods identify a number of episodes based on analysis of each social media content item of a corpus, identify a number of social content items to summarize each episode, and generate a timeline summarization of the corpus of social media content items.

20 Claims, 8 Drawing Sheets

(56) References Cited

OTHER PUBLICATIONS

Chang et al., Towards Twitter Context Summarization with User Influence Models, (2013) WSDM'13 at p. 527-536 (Year: 2013).*
Boecking et al., Predicting Events Surrounding the Egyptian Revolution of 2011 Using Learning Algorithms on Micro Blog Data (2014), Interdisciplinary Informatics Faculty Proceedings and Presentations 6 at p. 1-13 (Year: 2014).*
Mills, Amazon's Mechanical Turk lets you make $$$, sort of (2007), CNET, available from Internet <https://www.cnet.com/news/amazons-mechanical-turk-lets-you-make-sort-of/> (Year: 2007).*

* cited by examiner

```
for each post j, do         602
    Draw z_j ~ CRP(τ)
    if z_j is a new episode then                    604
        draw θ_{z_j} ~ Dir(η) and θ'_{z_j} ~ Dir(η')
        draw α_{z_j}, β_{z_j} ~ p(α,β|p̂,q̂,r̂,ŝ)   606
    end if
    Draw C_j ~ Multinomial(θ_{z_j})    608
    Draw L_j ~ Multinomial(θ'_{z_j})   610
    Draw t_j ~ Gamma(α_{z_j}, β_{z_j}) 612
end for
```

| Date | Timeline Episode | Representative Social Media Post of the Episode |
|---|---|---|
| June 5 | Lopez's concert in NYC | Jennifer Lopez Brings 15 Years of Hits Home to The Bronx |
| June 10 | Lopez on Jimmy Fallon's Show | The return of "Tight Pants" with Jennifer Lopez #FallonTonight |
| June 12 | Lopez on 2014 WorldCup Opening Ceremony | Jennifer Lopez, Pitbull and Claudia Leitte @FIFAWorldCup 2014 Opening Ceremony |
| June 16 | Gossip between Lopez and Casper Smart | Casper Smart – I Did Not Cheat on Jennifer Lopez |
| June 25 | Gossip between Lopez and Kim Kardashian | Jennifer Lopez asegura que el trasero de Kim Kardashian no esta de Nah!! |
| June 30 | Gossip between Lopez and Maksim Chmerkovskiy | Jennifer Lopez Addresses Maksim Chmerkovskiy Dating Rumors |
| July 13 | Comparing Lopez with Shakira at WorldCup Closing Ceremony | Feel proud shakira will be wearing a @CharbelZoe outfit at tonight's ceremony after jennifer lopez at the opening ceremony |
| July 18 | Indonesian talking about Lopez | Bagini Penampakan Jennifer Lopez Tetap Cantik Tanpa Makeup |
| July 24 | Lopez's Birthday | Happy Birthday Jennifer Lopez |

Figure 7

AUTOMATIC SOCIAL MEDIA CONTENT TIMELINE SUMMARIZATION METHOD AND APPARATUS

FIELD OF THE DISCLOSURE

The present disclosure relates to social networks, and more particularly to timeline summarization in a social networking system.

BACKGROUND

The popularity of information sharing platforms, such as are provided by social networking web services and web sites, is ever increasing. Users of a social networking web service are able to create and share information by posting, or otherwise submitting, the information to the social networking service for display, e.g., using a social networking service client application or a web browser, by other users of the social networking web service. The type of information sharing provided by conventional social networking services emphasizes the most recent posts, which causes the previously shared posts to become difficult to locate. As a consequence, it has become increasingly difficult for users to locate relevant information contained in posts. While a user might be able to scroll through multiple page displays in search of a post containing information relevant to the user's search, this approach requires considerable time and effort on the part of the user. In addition, this approach expends networking resources and media service resources to respond to the additional page displays.

SUMMARY

The present disclosure provides novel systems and methods for automatic summarization of social media content using a timeline comprising a set (or chain or timeline) of episodes and a summary of each episode. The disclosed systems and methods first detect the set of episodes by analyzing regular content, hashtag content and temporal information of social media data about an entity. A statistical machine model models and analyzes the regular content, hashtag content and temporal information in combination to determine the set of episodes by clustering the social media data items (or posts), where each cluster represents an episode in the set of episodes.

The disclosed system and methods then use a statistical machine modeling approach to generate a summary for each episode in the set. In some embodiments, in generating a summary for an episode, multiple types of features (e.g., temporal-based, content-based and popularity-based features) of each social media content item assigned to an episode are extracted and used to rank the social media content items in the episode. A number of the highest-ranked (or top-ranked) social media content items assigned to the episode is/are selected as the most representative social media content item(s) for the episode, and used in a summarization of the episode.

It will be recognized from the disclosure herein that embodiments of the instant disclosure provide improvements to a number of technology areas, for example those related to systems and processes that handle or process social media content generation and delivery to users over the internet, such as but not limited to, search engines, local and/or web-based applications, TV widgets, set-top boxes, or other types of content retrieval and/or distribution platforms, electronic social networking platforms and the like.

The disclosed systems and methods can effectuate increased speed and efficiency in the ways that users can access and retrieve social media content, thereby minimizing user effort, as the disclosed systems and methods, inter alia, reduce the amount of required input for a user searching for social media content. Users are provided with a fully automated experience through the disclosed systems' and methods' social media content timeline summarization of social media data (e.g., social media content such as social media content items and associated metadata, including temporal data). For example, the disclosed timeline generation and summarization avoids users having to scroll through page displays in search of a post, or posts, containing information relevant to the user's search; this approach requires considerable time and effort on the part of the user and wastes machine resources. In addition, the disclosed timeline generation and summarization reduces the expenditure of network resources and media service resources to respond to user page display requests.

In accordance with one or more embodiments, a method is disclosed which includes receiving, at a computing device, a request from a social media service user for information about an entity; identifying, via the computing device, a plurality of social media content items, the social media content item identification comprising searching a number of social media content item data stores for the plurality of social media content items containing information about the entity; determining, via the computing device and using each social media content item of the plurality, an episode timeline comprising a number of episodes, the episode timeline determination comprising modeling, using statistical machine modeling, content of the plurality of social media content items in combination with temporal information of the plurality of social media content items, the timeline determination further comprising assigning a number of social media content items of the plurality to each episode of the number; determining, via the computing device and for an episode, a ranking of the number of social media content items assigned to the episode, the rank determination comprising determining a set of features for each social media content item of the number and using statistical machine modeling to rank the social media content items of the number; automatically selecting, via the computing device and for the episode, a predetermined number of top-ranked social media content items from the number assigned to the episode; and automatically creating, via the computing device, a timeline summarization of the plurality of social media content items, the timeline summarization comprising a number of entries corresponding to the number of episodes of the episode timeline, an entry comprising the content of the predetermined number of top-ranked social media content items automatically selected for a corresponding episode of the number of episodes.

In accordance with one or more embodiments, a non-transitory computer-readable storage medium is provided, the non-transitory computer-readable storage medium tangibly storing thereon, or having tangibly encoded thereon, computer readable instructions that when executed cause at least one processor to perform a method for automatically summarizing social media content using a timeline comprising a set (or chain) of episodes and a summary of each episode.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

DRAWINGS

The above-mentioned features and objects of the present disclosure will become more apparent with reference to the following description taken in conjunction with the accompanying drawings wherein like reference numerals denote like elements and in which.

Figure 5A:
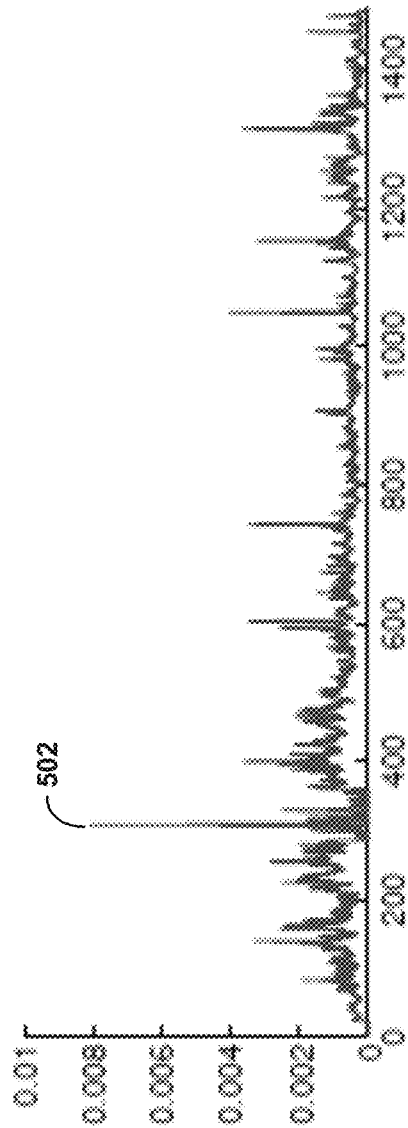
Figure 5B:
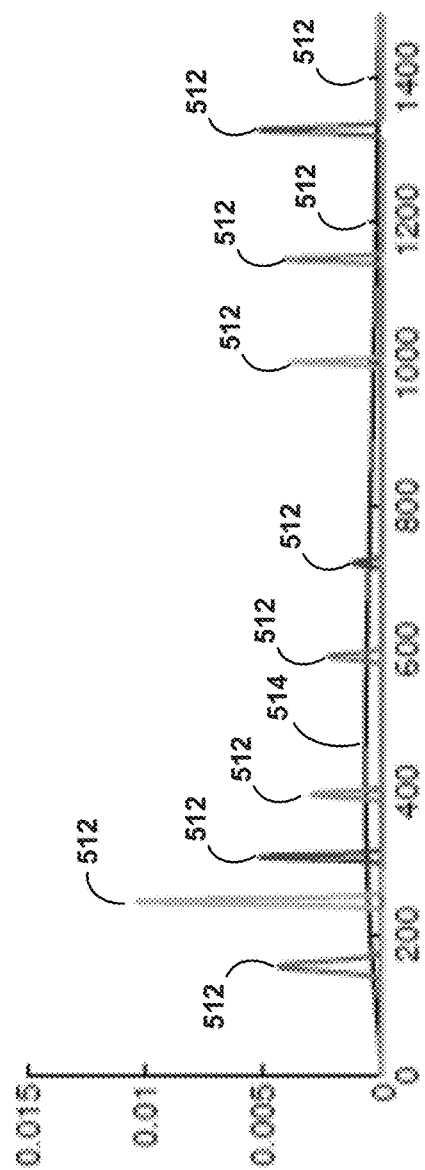
Figure 8:
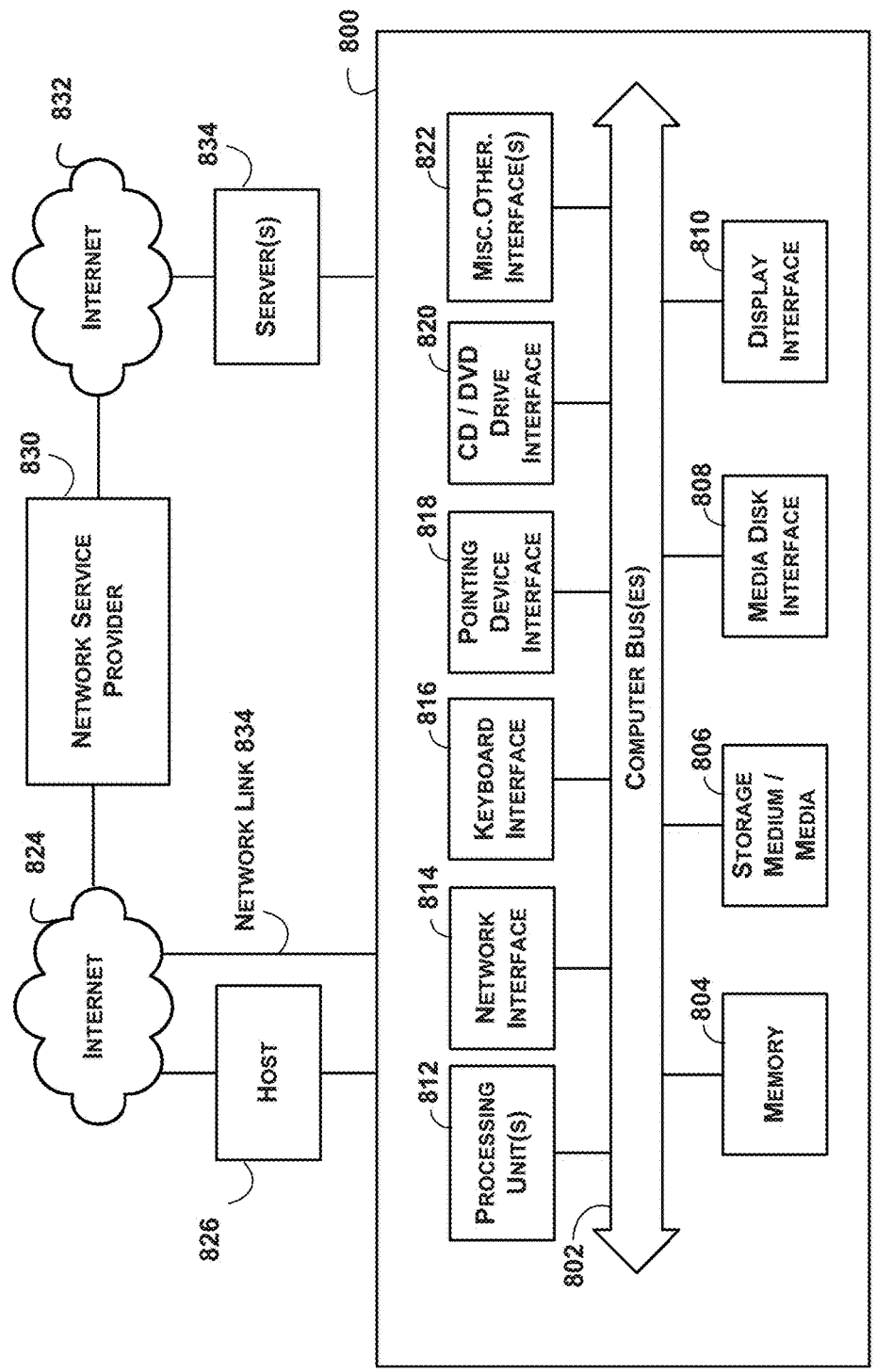

FIG. 5, comprising FIGS. 5A and 5B, provides exemplary graphic examples of a non-limiting embodiment in accordance with some embodiments of the present disclosure;

FIG. 6 is an exemplary example of a process performed in accordance with some embodiments of the present disclosure;

FIG. 7 is an exemplary example of a non-limiting embodiment in accordance with some embodiments of the present disclosure; and FIG. 8 is a block diagram illustrating the architecture of an exemplary hardware device in accordance with one or more embodiments of the present disclosure.

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via email, for example Yahoo!® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing or displaying various forms of content, including locally stored or streamed video, or games (such as fantasy sports leagues). The foregoing is provided to illustrate that claimed subject matter is intended to include a wide range of possible features or capabilities.

The detailed description provided herein is not intended as an extensive or detailed discussion of known concepts, and as such, details that are known generally to those of ordinary skill in the relevant art may have been omitted or may be handled in summary fashion.

The principles described herein may be embodied in many different forms. By way of background, a content item, such as a social media content item, can comprise text, multimedia, audio, video, or other type of content or combination thereof. In one example, a social media content item is typically generated by a user; the social media content item is typically submitted for online publication to a social media, or social networking, platform, application or technology, such as and without limitation Facebook®, YouTube®, Tumblr®, Twitter®, Google+®, or the like. In addition, a content item, such as a social media content item, can include, or have associated therewith, temporal information, such as a date alone or in combination with a time, for the content item.

With the widespread popularity of user generated content, such as social media content, there is currently a huge demand for easy-to-use tools to search for and retrieve relevant social media content. Currently, for example, no social media site has the ability to automatically respond to the query "what were the major activities of Lionel Messi during the 2014 World Cup" or the query "what was posted about Jennifer Lopez in 2014". Since existing systems cannot provide such a search mechanism, existing systems are cumbersome to use because they require users to sift through social media content items to locate information. This makes existing systems difficult to use and requires extensive human effort and experience. In addition, it expends considerable system and networking resources in responding to user's requests for retrieval and display of social media content items.

As such, the instant disclosure provide a novel solution addressing the immediate demand for an automated system, application, platform and/or technology that summarizes media content (e.g., social media content) for efficient access. The present disclosure provides novel systems and methods for automatic summarization of social media content using a timeline comprising a set (or chain) of episodes and a summary of each episode. According to some embodiments, the disclosed systems and methods first detect the set of episodes by analyzing content (e.g., regular content and hashtag content) in combination with temporal information of social media data about an entity. A statistical machine model models and analyzes the content and temporal information in combination to determine an episode timeline comprising a set of episodes by clustering the social media data items (or posts), where each cluster represents an episode in the set of episodes of the episode timeline. As is discussed in more detail below, a novel Bayesian nonparametric model is used to analyze the content (e.g., regular content and hashtag content) and temporal information in combination. In some embodiments, a sampling, such as Gibbs sampling, is used to infer the model parameters, and a fast burn-in strategy based on temporal bursts is used to accelerate the model inference. The fast burn-in strategy can be used to identify temporal bursts in a time series generated using temporal information, which time bursts can represent an initial estimation of the number and location of episodes of the episode timeline. In some embodiments, the initial estimation can be used by the Gibbs sampling to determine a posterior distribution of the Bayesian nonparametric model.

The disclosed system and methods then use a statistical machine modeling approach to generate a summary for each episode in the set. In some embodiments, in generating a summary for an episode, multiple types of features (e.g., temporal-based, content-based and popularity-based features) of each social media content item assigned to an episode are extracted and used to rank the social media content items in the episode. A number of the highest-ranked (or top-ranked) social media content items assigned to the episode is/are selected as the most representative social media content item(s) for the episode, and used as a summary of the episode. In some embodiments, a learning-to-rank approach is used with the extracted features to rank the social media content items to identify a highest-ranked post, or posts, for each episode.

The benefits of the disclosed systems and methods can be evidenced multi-fold: 1) the disclosed systems and methods provide a technologically based mechanism for automatic generation of a timeline and summarization of social media content items (or social media posts); (2) the disclosed systems and methods are based on techniques that are specifically designed to simultaneously analyze and model temporal information in combination with content information, which content information can include regular content and hashtag content, to determine an episode timeline comprising a set of episodes; and (3) the disclosed systems and methods analyze and model temporal-based, content-based and popularity-based features of social media content items (or social media posts) in generating a summary of each detected episode. Thus, the disclosed systems and methods, for example, detect social media episodes and generate episode summaries in a fully automated manner that is predicated on analyzing content in combination with temporal information of each social media content item and using a number of features, including popularity-based features, content-based and temporal-based features of the social media content items to select a number of social media content items to summarize each episode of the detected timeline of episodes.

The disclosed systems and methods can be implemented for any type of content, including, but not limited to, video, audio, images, text, and/or any other type of multimedia content. While the discussion herein will focus on text-based social media content items, it should not be construed as limiting, as any type of content or multimedia content, whether known or to be known, can be utilized without departing from the scope of the instant disclosure. A social media content item can comprise regular content, such as text-based content, and may optionally comprise hashtag content. In addition, a social media content item can include, or have associated therewith, metadata, such as temporal information. The temporal information can include time and date information of the submission, or posting, of the social media content item.

Figure 1:
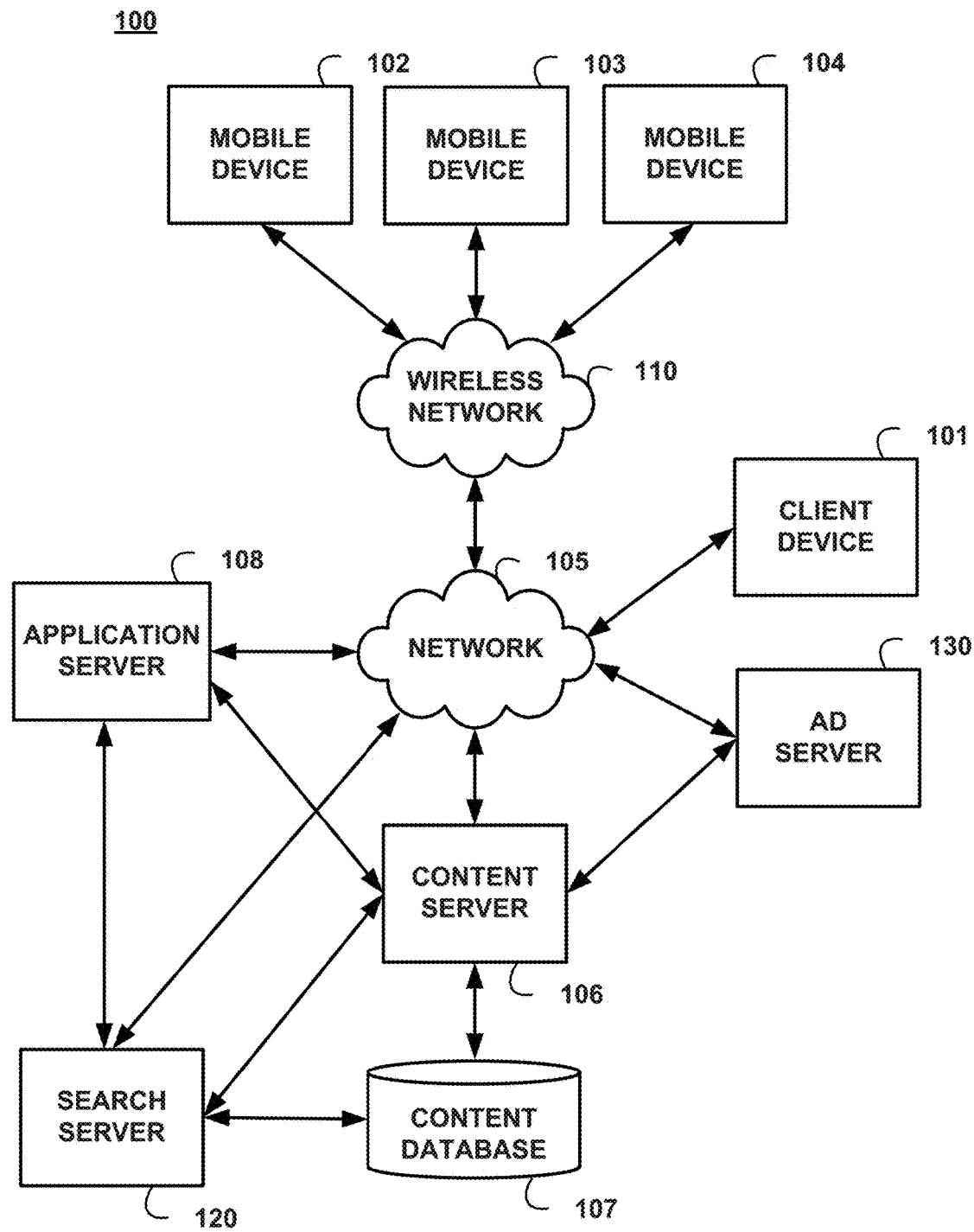
FIG. 1 is a schematic diagram illustrating an example of a network within which the systems and methods disclosed herein could be implemented according to some embodiments of the present disclosure.

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108, search server 120 and advertising ("ad") server 130.

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, searching for, viewing and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or accessible to an electronic social networking site. A social network refers generally to an electronic network of individuals, such as acquaintances, friends, family, colleagues, or co-workers, coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site or service, such as streaming media site/service (e.g., YouTube®), an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a video application and/or video platform, can be provided via the application server 108, whereby a user is able to utilize such service upon the user being authenticated, verified or identified by the service. Examples of content may include images, text, audio, video, or the like, which may be processed in the form of physical signals, such as electrical signals, for example, or may be stored in memory, as physical states, for example.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108, 120 and/or 130. This may include in a non-limiting example, authentication servers, search servers, email servers, social networking services servers, SMS servers, IM servers, MMS servers, exchange servers, photo-sharing services servers, and travel services servers, via the network 105 using their various devices 101-104. In some embodiments, applications, such as a streaming video application (e.g., YouTube®, Netflix®, Hulu®, iTunes®, Amazon Prime®, HBO Go®, and the like), blog, photo storage/sharing application or social networking application (e.g., Flickr®, Tumblr®, and the like), can be hosted by the application server 108 (or content server 106, search server 120 and the like). Thus, the application server 108 can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 16, 18, 120 and/or 130.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

Figure 2:
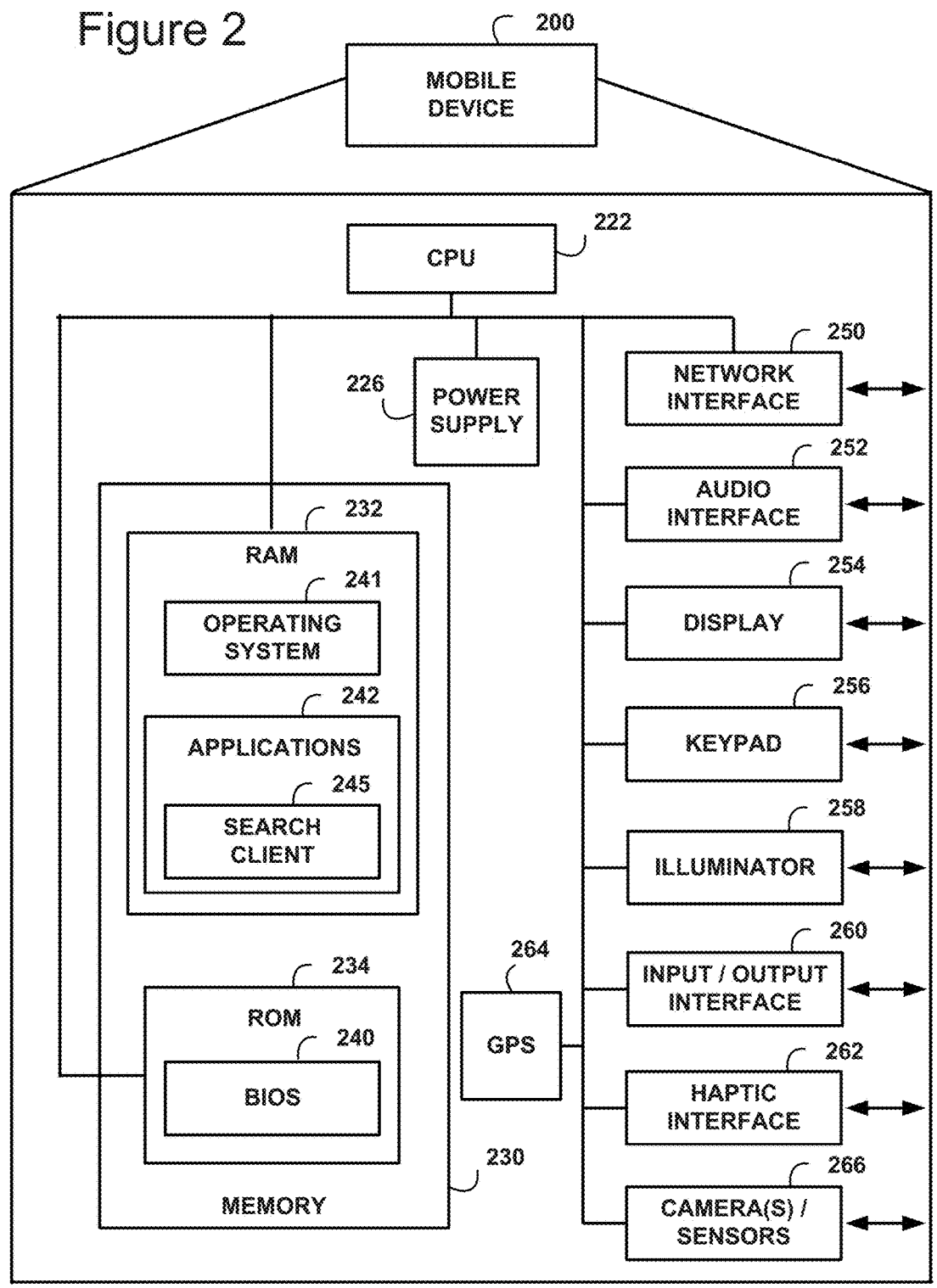
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies as discussed above. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the client device 200 receives a communication from another user.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by client device 200 to store, among other things, applications 242 and/or other data. For example, data stores may be employed to store information that describes various capabilities of client device 200. The information may then be provided to another device based on any of a variety of events, including being sent as part of a header during a communication, sent upon request, or the like. At least a portion of the capability information may also be stored on a disk drive or other storage medium (not shown) within client device 200.

Applications 242 may include computer executable instructions which, when executed by client device 200, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query message, where another search client manages search results, and yet another search client is configured to manage serving advertisements, IMs, emails, and other types of known messages, or the like.

Having described the components of the general architecture employed within the disclosed systems and methods, the components' general operation with respect to the disclosed systems and methods will now be described below.

Figure 3:
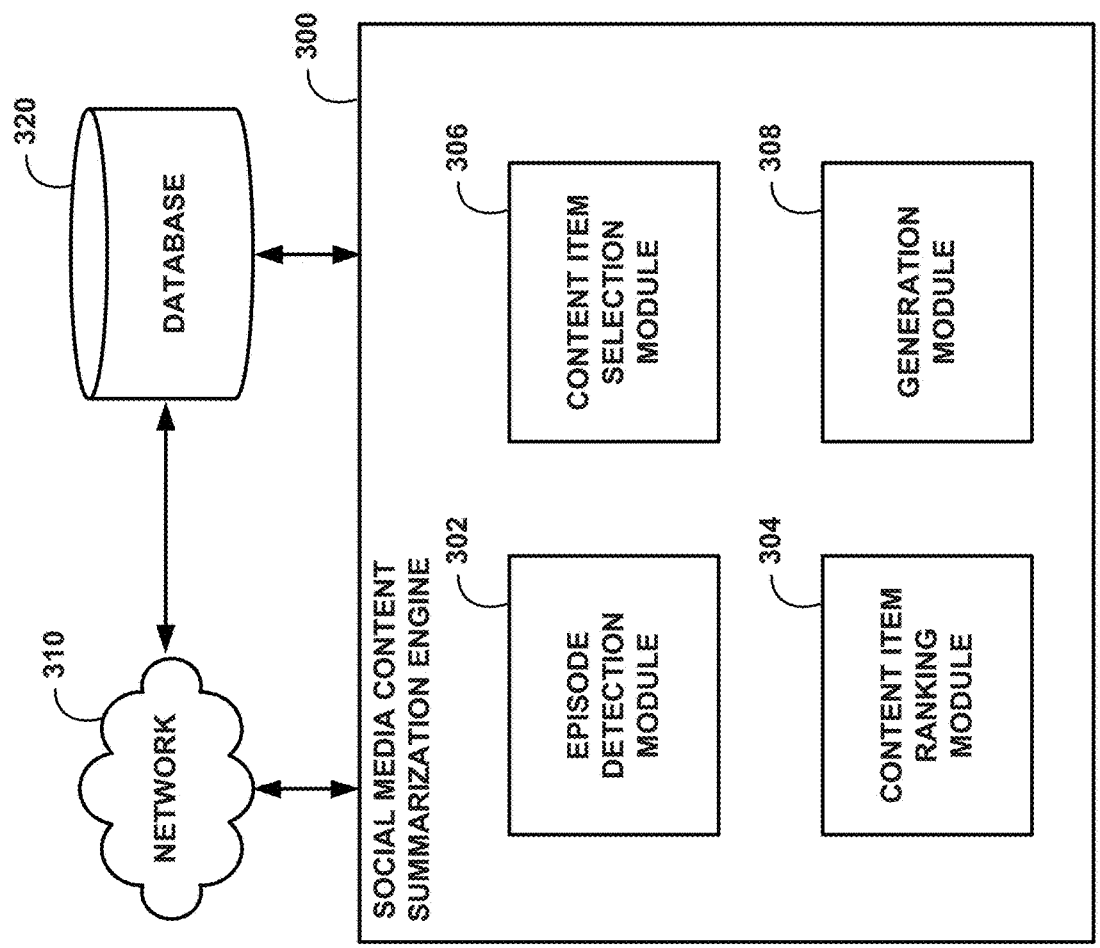
FIG. 3 is a schematic block diagram illustrating components of an exemplary system in accordance with embodiments of the present disclosure.

FIG. 3 is a block diagram illustrating the components for performing the systems and methods discussed herein. FIG. 3 includes a social media content summarization (or content summarization) engine 300, network 310 and database 320. The content summarization engine 300 can be a special purpose machine or processor and could be hosted by an application server, content server, social networking server, web server, search server, content provider, email service provider, ad server, user's computing device, and the like, or any combination thereof.

According to some embodiments, content summarization engine 300 can be embodied as a stand-alone application that executes on a user device. In some embodiments, the content summarization engine 300 can function as an application installed on the user's device, and in some embodiments, such application can be a web-based application accessed by the user device over a network. In some embodiments, the content summarization engine 300 can be installed as an augmenting script, program or application to another media application (e.g., Tumblr®, Facebook®, and the like).

The database 320 can be any type of database or memory, and can be associated with a content server on a network (such as and without limitation a content server, search server, application server, etc.) or a user's device. Database 320 comprises a dataset of data and metadata associated with local and/or network information related to users, services, applications, content (e.g., video) and the like. Such information can be stored and indexed in the database 320 independently and/or as a linked or associated dataset. It should be understood that the data (and metadata) in the database 320 can be any type of information and type, whether known or to be known, without departing from the scope of the present disclosure.

According to some embodiments, database 320 can store data for users, e.g., user data. According to some embodiments, the stored user data can include, but is not limited to, information associated with a user's profile, user interests, user behavioral information, user attributes, user preferences or settings, user demographic information, user location information, user biographic information, and the like, or some combination thereof. In some embodiments, the user data can also include, for purposes generating and/or delivering social media content summaries, user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can store data and metadata associated with a social media content item from an assortment of service providers. For example, the information can include, but is not limited to, the social media content item, which can include both regular content and hashtag content, and temporal information, such as at least one date and time, which can be included in the social media content item or be associated with the social media content item. Such information can be derived from information provided by the user, a service provider (i.e., Yahoo!®, Tumblr®, Facebook®, Twitter® and the like), or some combination thereof.

According to some embodiments, such social media content item information can be represented as an n-dimensional vector (or feature vector) for each social media content item, where the information associated with the social media content item, e.g., regular content information, hashtag content information, temporal information, popularity information can be translated as a node on the n-dimensional vector. Database 320 can store and index social media content information in database 320 as a linked set of social media content data and metadata. Such storage can be realized through any known or to be known vector or array storage, including but not limited to, a hash tree, queue, stack, VList, or any other type of known or to be known dynamic memory allocation technique or technology.

While the discussion below will involve vector analysis of information, including social media content item data and associated information, as discussed above, the information can be analyzed, stored and indexed according to any known or to be known computational analysis technique or algorithm, such as, but not limited to, cluster analysis, data mining, Bayesian network analysis, Hidden Markov models, artificial neural network analysis, logical model and/or tree analysis, and the like.

For purposes of the present disclosure, as discussed above, social media content item and associated information or metadata (which are stored and located in database 320) as a whole are discussed within some embodiments; however, it should not be construed to limit the applications of the systems and methods discussed herein. That is, while reference is made throughout the instant disclosure to social media content items (or posts), other forms of user generated content and associated information, including for example text, audio, multimedia, RSS feed information can be used without departing from the scope of the instant application, which can thereby be communicated and/or accessed and processed by the content summarization engine 300 according to the systems and methods discussed herein.

The network 310 can be any type of network such as, but not limited to, a wireless network, a local area network (LAN), wide area network (WAN), the Internet, or a combination thereof. The network 310 facilitates connectivity of the content summarization engine 300, and the database of stored resources 320. Indeed, as illustrated in FIG. 3, the content summarization engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as content summarization engine 300, and includes episode detection module 302, content item ranking module 304, content item selection module 306, and summary generation (or generation) module 308. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed with reference to FIG. 4.

As discussed in more detail below, the information processed by the content summarization engine 300 can be supplied to the database 320 in order to ensure that the information housed in the database 320 is up-to-date as the disclosed systems and methods leverage real-time information and/or behavior associated with the social media content item(s), timeline summaries, user and/or the user's device during or responsive to social media content item summary creation, distribution and rendering, as discussed in more detail below.

Figure 4:
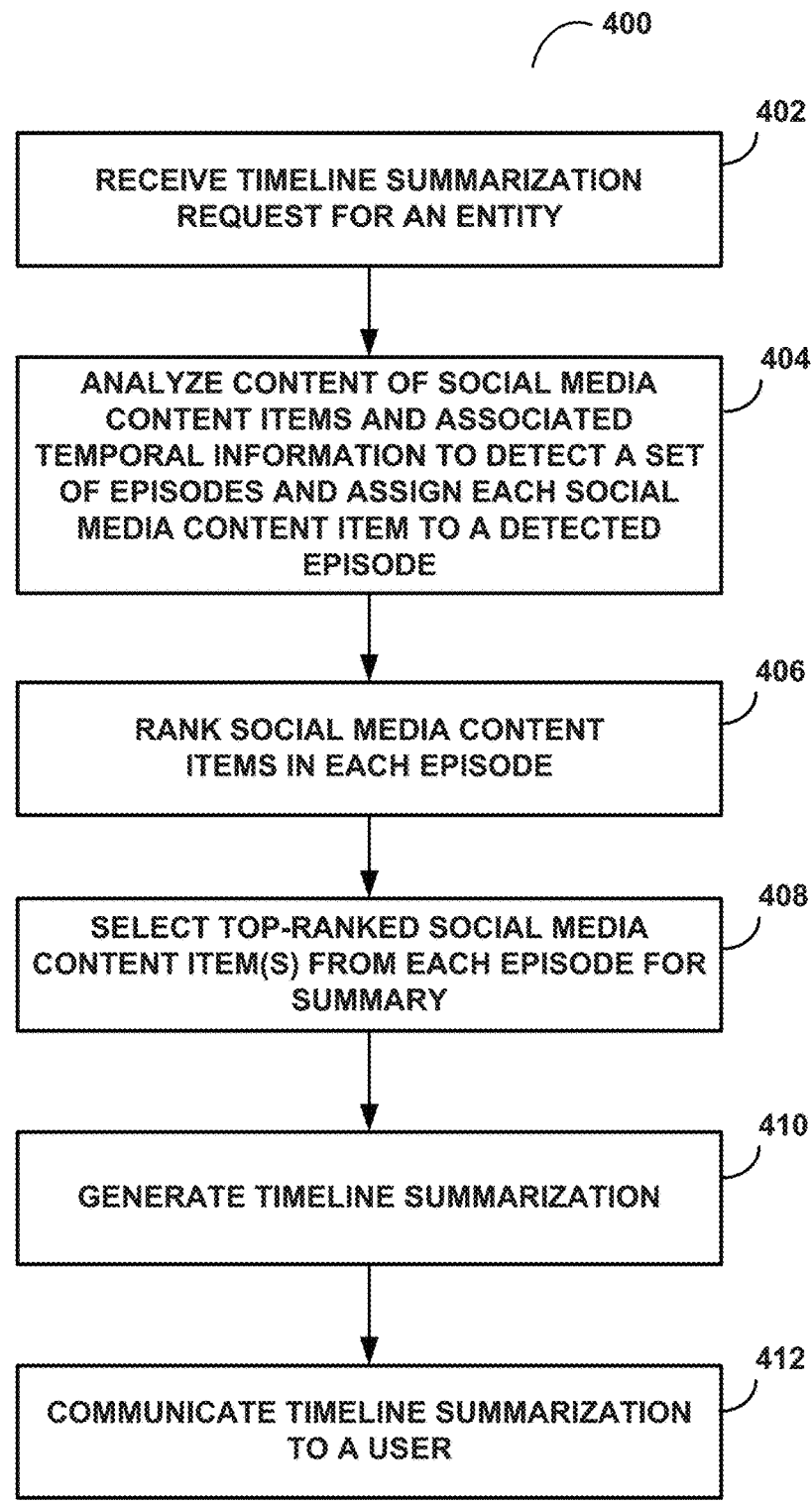
FIG. 4 is a flowchart illustrating steps performed in accordance with some embodiments of the present disclosure.

FIG. 4 provides a process flow overview in accordance with one or more embodiments of the present disclosure. Process 400 of FIG. 4 details steps performed in accordance with exemplary embodiments of the present disclosure for automatically summarizing social media content using a timeline comprising a set (or chain) of episodes and a summary of each episode. According to some embodiments, as discussed herein with relation to FIG. 4, the process involves automatically detecting a number of episodes from a corpus of social media content items, e.g., a corpus of social media content items about a given entity (e.g., a person, point of interest, etc.) and identifying one or more social media content items per episode as an episode summary in order to automatically create a timeline summarization for the entity. Such detection and identification involves, analyzing regular content, hashtag content and temporal information of each social media content item of a corpus of social media content items in order to detect a number (or set) of episodes; extracting features (e.g., temporal-based, content-based and popularity-based features for each social media content item of each episode in order to rank the social media contents items within each episode; selecting a number of the highest-ranked social media content items belonging to an episode in order to generate a summary for the episode; and aggregating information for each episode in order to generate a timeline summarization for the corpus of social media items, as discussed in more detail below.

At step 402, a request is received by content summarization engine 300. The request identifies an entity, such as a person, a point of interest, an event, etc. The entity identification information can be used alone or in combination with additional information to identify a corpus of social media content items relevant to the identified entity, e.g., by searching one or more data stores for the corpus of social media content items using one or more queries, each of which comprising a number of search terms for the identified entity.

At step 404, which is performed by episode detection module 302, detects a set of episodes by analyzing content (e.g., regular content and hashtag content) in combination with temporal information of social media data about an entity. In accordance with one or more embodiments, a statistical machine modeling is used to model and analyze the regular content, hashtag content and temporal information in combination to determine an episode timeline comprising a set of episodes by clustering the social media data items (or posts), where each cluster represents an episode in the set of episodes. The clustering result comprises a set of detected episodes and an assignment of each social media content item to a detected episode.

In some embodiments, episode detection can be performed using a product life cycle (PLC) type model. A conventional PLC model assumes that four phases cover the life span of a product: introduction (e.g., product is newly launched), growth (e.g., awareness, appreciation and acceptance of the product by the public), equilibrium (e.g., sales growth slows, sales volume peaks and stabilizes) and decline (e.g., market saturation, obsolescence, changing customer taste). Unlike a conventional PLC, the life cycle of social media content can have sudden spikes and a heavy tail pattern. Thus, a statistical machine modeling, such as a Gamma distribution with model parameters α (a shape parameter) and (a rate parameter), is used in some embodiments of the present disclosure to capture life cycles with sudden spikes and heavy tail patterns in the temporal information associated with the social media content items of the corpus identified at step 402. The probability density function of the Gamma distribution function with model parameters α and β can be expressed as:

$$p(t \mid \alpha_k, \beta_k) = \frac{\beta_k^{\alpha_k}}{\Gamma(\alpha_k)} t^{\alpha_k-1} e^{\beta_k t}, \; \Gamma(\alpha) = \int_0^\infty t^{\alpha-1} e^{-t} dt, \quad \text{Expr. (1)}$$

where t represents a time value, e.g., a value specified by temporal information associated with a social media content item, belonging to the set of temporal information T of the social media content items of the corpus, k is an episode in a set of episodes, K, and p is the probability that time t belongs to episode k given $\alpha_k$ and $\beta_k$. Embodiments of the present disclosure detect episode k for the set K by modeling the content information (discussed below) and the temporal information in combination, where the modeling of the temporal information chooses a gamma distribution that is closest to the time series defined by the temporal information associated with each social media content item in the corpus of social media content items.

FIGS. 5A and 5B provide a graphical illustration. FIG. 5A graphically depicts a time series using a time frequency graph of temporal information associated with a corpus of social media content items. The x-axis corresponds to time (in hour increments) and the y-axis corresponds to frequency. The peak 502 is associated with the largest number of social media content items. The depicted time series is a jagged line with a number of peaks. FIG. 5B illustrates episodes detected using the temporal information used to generate the graph in FIG. 5B in combination with the regular content and the hashtag content of the social media content items associated with the temporal information. Each peak 512 corresponds to an episode k of the set of episodes K detected from the social media content items. In modeling a corpus of social media content items, a number of social media content items may be assigned to a background episode, which is represented by the graph 514 in FIG. 5B. In some embodiments, a background episode is not included in the set of episodes of an episode timeline.

Peaks (or episodes) 512 reflect both temporal information modeling and content information modeling. In other words, each peak 512 (which represents one episode) is detected by modeling the temporal information and modeling the content information of a corpus of social media content items. The content of a social media content item in the corpus can comprise both regular content and hashtag content (e.g., hashtag labels). For example, around 10% of social media content items contain hashtag content. Regular content is usually short, informal and highly unstructured; while hashtag content, which is usually sparse, provides informative signals to indicate the labels or metadata tags of social media content items. Accordingly, content information modeling models both regular content and hashtag content; however, in some embodiments, regular content and hashtag content are modeled separately, which avoids a possibility that the hashtag content is overwhelmed by regular content.

For each episode with D social media content items, C denotes regular content and L denotes hashtag content. In some embodiments, multinomial distributions are used to model the tokens (or words) used in D, such that one multinomial distribution is used to model the regular content C and another multinomial distribution is used to model the hashtag content L. The regular content of a social media content item is represented as a bag of words, and the hashtag content of the social media content item is represented as a bag of words. Expressions (2) and (3) provide an exemplary example of multinomial distributions used, with parameter θ used in expression (2) in modeling regular content C and parameter θ' used expression (3) in modeling hashtag content L:

$$p(c \mid \theta_k) = \frac{V!}{\prod_{i=1}^{V} f(c_i)!} \prod_{i=1}^{V} \theta_{ki}^{f(c_i)} \quad \text{Expr. (2)}$$

$$p(c \mid \theta'_k) = \frac{V!}{\prod_{i=1}^{V} f(l_i)!} \prod_{i=1}^{V} \theta'^{f(l_i)}_{ki} \quad \text{Expr. (3)}$$

In expressions (2) and (3), V is the number of tokens, $f(c_i)$ refers to the term frequency of token $c_i$ in the regular content c of a social media content item, and $f(l_i)$ refers to the term frequency of token $l_i$ in the hashtag content l of a social media content item.

In some embodiments, a Bayesian nonparametric generative statistical machine modeling approach is used as the statistical machine model to model and analyze the regular content, hashtag content and temporal information in combination in order to detect the set of episodes and assign each social media content items of a corpus to a detected episode. In some embodiments, a Bayesian nonparametric generative modeling approach generates a statistical machine model that models and analyzes the regular content, hashtag content and temporal information in combination in order to determine a number of episodes K and assign each of the social media content items to a detected episode k of the detected episodes. This machine learning approach adapts to the complexity of the data being modeled (the temporal and content data of the corpus of social media content items) and clusters the data, where each cluster corresponds to an episode. The Bayesian nonparametric machine learning approach is generative in that it updates a prior probability to a posterior probability based on the temporal and content information of the corpus of social media content items. The posterior probability provides a distribution over a number of episodes, an assignment the corpus of social media content items to episodes and parameters associated with each cluster.

In one embodiment, a Dirichlet prior is used as the prior probability for the model parameters θ and θ', which can be expressed as Dir(η) and Dir(η') (respectively), and the prior for the Gamma distribution used in modeling the temporal information can be represented using the following exemplary expression:

$$p(\alpha, \beta \mid \hat{p}, \hat{q}, \hat{r}, \hat{s}) \propto \frac{\hat{p}^{\alpha-1} e^{-\beta \hat{q}}}{\Gamma(\alpha)^{\hat{r}} \beta^{-\alpha \hat{s}}} \quad \text{Expr. (4)}$$

The posterior probability provides a distribution over a number of episodes, an assignment the corpus of social media content items to episodes and parameters associated with each cluster. The Bayesian nonparametric generative model infers the number of episodes from the corpus of social media content items and allows the number of episodes to grow as each social media content item of the corpus is considered, or observed. In this approach, each social media content item is assumed to belong to an episode. The Bayesian nonparametric generative model determines an episodic structure of the corpus of social media content items and a distribution of the corpus of the social media content items over the episodic structure. In some embodiments, the episodic structure is initially considered to be infinite and a process, such as the Chinese restaurant process (CRP) which favors assigning data to the corpus of social media content items to a small number of episodes, can be used. CRP is a sequential process in which (aside from the first social media content item) each social media content item's assignment to an episode is dependent on the episode assignments of the previous assignment(s) of social media content item to episode(s).

FIG. 6 provides an example of a generative process 600. The steps shown in the exemplary example process 600 are performed for each social media content item (referred to as post j in the example). At step 602, an episode, $z_1$, is selected for the current social media content item j using CRP with the parameter τ, or probability distribution. Steps 604 and 606, which are performed if $z_j$ is a new episode, associates a set of parameters, such that the new episode is associated with an regular content modeling parameter $\theta_{z_j}$ drawn from Dir(η), a hashtag content modeling parameter $\theta'_{z_j}$ drawn from Dir(η') and a temporal information modeling parameter drawn from $p(\alpha, \beta | \hat{p}, \hat{q}, \hat{r}, \hat{s})$. The regular content and hashtag content of post j is modeled using multinomial distributions with parameters $\theta_{z_j}$ and $\theta'_{z_j}$ (respectively), and the temporal information associated with post j is modeled using a gamma distribution with parameters $\alpha_{z_j}$ and $\beta_{z_j}$, as shown in steps 608-612.

In some embodiments, a sampling such as Gibbs Sampling, which is a Markov Chain Monte Carlo machine learning algorithm, can be used to derive a conditional distribution Z and α and β. A fast burn-in strategy of Gibbs Sampling is used in some embodiments to approximate the posterior distributions. In other words, a fast burn in strategy for Gibbs sampling can be used to set a starting point based on temporal bursts identified using the temporal information associated with the corpus of social media content items. In accordance with at least one embodiment, a time series, such as that graphically depicted example of FIG. 5A, is analyzed to detect major bursts, and the social media content items around a given burst are at least initially assumed to belong to a same episode. Each rise and fall pattern can be modeled with a kernel function, each time series can be modeled as a mixture of kernel function and true bursts are differentiated from jagged noisy peaks. The number and location of true peaks in a time series can be identified using an optimization approach, which can be represented using the following exemplary expression:

$$\min_{\omega} \Sigma_{t=1}^T (y_t - \Sigma_{p=1}^T \omega_p^T \hat{g}(t; \Gamma, p))^2 + \lambda \Sigma_{p=1}^T \|\omega_p\|_2, \quad \text{Expr. (5)}$$

such that $\omega_{p,l} \geq 0$, $l=1, 2, \ldots, b$, $p=1, 2, \ldots, T$,
where $\Sigma_{p=1}^T \|\omega_p\|_2$ is a group regularizer and λ is a regularizer parameter. The group regularizer comprises a $L_2$-regularizer for ω and $L_1$ regularizer between groups $\|\omega_1\|_2, \|\omega_2\|_2, \ldots \|\omega_T\|_2$. That is, the estimated parameter ω tends to be dense within the group, and a few groups (i.e., ω) take non-zero values.

In some embodiments, a time series y can be fit using a group lasso based mixture model estimation, a magnitude of each estimated group lasso parameter ω can be determined, and a top K−1 group lasso parameters can be selected by ranking the magnitude ω, (or $[\|\hat{\omega}_1\|_2, \ldots, \|\hat{\omega}_T\|_2]$ with burst labels 1 . . . K−1. Then, the burst labels can be assigned to each post with the same timestamp, and the label K (which is a background label) can be assigned to the any remaining posts (that is, any remaining post(s) not assigned to one of the 1 . . . K−1 labels) as a background episode.

The temporal bursts detected from the fast burn-in strategy used in some embodiments provides an initialization for the Gibbs Sampling process used in accordance with one or more embodiments. In other words, the fast-burn in process can be used to assign social media content items to one of the 1 . . . K−1 episodes or a background episode, and then the modeling of the content (which can comprise regular content and/or hashtag content modeled separately) can be used to determine whether a social media content item is to be reassigned to one of the 1 . . . K−1 episodes or a background episode.

As a result of step 404, a number of episodes are detected and each social media content item of the corpus of social media content items is assigned to an episode. Step 406, which is performed by content item ranking module 304 for each episode, the social media content items assigned to the episode are ranked. In some embodiments, an extraction-based approach is used, at step 406, to extract features of each of the social media content items in an episode, which features are used to rank the social media content items in an episode, and the ranking is used to select a number of the top-ranked social media content items in the episode as summary of the episode. In other words, in a summary ranking phase, a number of the social media content items are selected as the most representative social media content items for the summary of each timeline episode by ranking the social media content items in each detected episode. In some embodiments, extracted features are analyzed using a statistical machine learning approach, such as a learning-to-rank machine learning model. In some embodiments, three types of features are extracted from each social media content item: temporal-based, content-based and popularity-based features.

In accordance with some embodiments, it is assumed that a representative social media content item is issued when its timestamp exactly matches or is very close to a temporal peak within a timeline episode. Therefore temporal information provides valuable information for ranking posts for summarization. In some embodiments, the temporal-based feature for a social media content item is expressed as the temporal difference (or gap) between its timestamp and the temporal peak of the episode. The temporal peak of the episode can be determined from an aggregate of the temporal information associated with the social media content item(s) assigned to the episode at step 404.

In some embodiments, a number of content-based features can be determined for each social media content item. One such content-based feature is a similarity measure which can be determined using a centroid-based method. In one example, each social media content item d can be represented as a term frequency-inverse document frequency (TF-IDF) vector $\vec{d}$, and then a cosine similarity can be computed with the centroid vector $\vec{c}$ that can be computed using the following exemplary expression:

$$\vec{c} = \frac{\sum_{d \in E} E^{\vec{d}}}{|E|}, \quad \text{Expr. (6)}$$

where E is the set of social media content items in the episode. In some embodiments, addition content-based features are extracted, such as and without limitation a language detection feature which indicates whether or not the social media content item is in English, and a length (e.g., text length) feature which represents the length of the social media content item. The language of a social media content item can be determined using any language detection tool, including the language detection library provided by Cybozu Labs, Inc.

In some embodiments, popularity-based features are used for timeline summarization. For those social media content items with higher popularity, it is likely that they are representative and of high quality, although popularity need not be equivalent to quality. One or more of the following data can be used in determining a social media content item's popularity: number of replies, a number of times the social media content item is reposted, forwarded, retweeted, etc., a number of "likes", and/or an author's popularity (e.g., number of followers for a given social media content item's author). In some embodiments, the popularity features can be normalized with a corresponding z-score, which can be expressed using the following exemplary expression:

$$z_i = \frac{x_i - \mu}{\sigma},$$ Expr. (7)

where $z_i$ represents the z-score of a social media content item i, $\mu$ is the mean of the vector $\vec{x}=[x_1, \ldots]$ of popularity measures (e.g., number of reposts, number of replies, number of followers, number of likes, etc.) and a is its standard deviation.

In accordance with one or more embodiments, the features determined for each social media content item can be aggregated and used to rank the social media content items in an episode. In some embodiments, a learning-to-rank machine learning algorithm can be used in ranking the social media content items in an episode. In one example, a Gradient Boosted Decision Tree (GBDT) algorithm is trained to rank all candidate social media content items, and to select the highest ranked ones as the summary of each timeline episode.

In step 410, the generation module 308 generates a timeline summarization using the episodes detected at step 404 and the top-ranked social media content items selected at step 408, which is performed by content item selection module 306. FIG. 7 provides an example of a timeline summary which can be generated using embodiments of the present disclosure. In the example, nine timeline episodes were detected from a corpus of social media content items about Jennifer Lopez posted during 2014. In the example, each episode is identified by a date, a short description or title, and a representative social media content item of the episode. The short description/title can be selected from the social media content items of the episode or from an external source, such as and without limitation an external calendar of events source, using the episode's identified date. The date can be the date of the representative social media content item selected at step 408, the date associated with the local peak determined at step 408, etc.

In step 412, the generated timeline summarization is communicated to a user for display on the user's device. In some embodiments, such communication can involve automatically rendering the timeline summarization upon display on the user's device, and in some embodiments, such communication can involve a user sharing the timeline summarization with another user. In some embodiments, sharing of the timeline summarization with an identified set of users can be performed automatically upon generation of the timeline summarization, where not only does the requesting user receive the timeline summarization, but also other users who follow the user, or have been identified by the user, can be provided the generated timeline summarization (e.g., reblogging, reposting, retweeting, etc. the timeline summarization to a user's followers pages on a social media site, such as and without limitation Tumblr®). As will be understood by those of skill in the art, sharing a generated timeline in this manner could result in improved user engagement in social media content from which the timeline summarization was created and/or the generated timeline summarization, as well as increased activity by users on a social networking site that hosts and/or creates such timeline summarizations.

According to some embodiments of the present disclosure, information associated with a generated timeline summarization, as discussed above in relation to process 400, can be fed back to the timeline summarization engine 300 for modeling (or training) of the information stored in database 320 via iterative or recursive bootstrapping or aggregation functionality. This can improve the accuracy of episode detection and social content item ranking and selection, as discussed above. Embodiments of the present disclosure involve the timeline summarization engine 300 applying such recursive/bootstrapping functions utilizing any known or to be known open source and/or commercial software machine learning algorithm, technique or technology.

Since a timeline summarization can be generated without human effort as described herein, such timeline summarization can be precomputed (and periodically updated) and stored in one or more database servers. Users can be given access to generated timeline summarizations stored on the database server(s) so that the users can review any timeline summarization and/or share any timeline summarization. A timeline summarization provides a more efficient mechanism for retrieving the information than the alternative, i.e., reviewing the social media content items in the corpus, which likely would involve reviewing a number of social media content items with redundant information. In this way, a timeline summarization is more appealing and increases user engagement and increases the number of active users engaged.

According to some embodiments, a timeline summarization can be retrieved and presented to a user in response to the user's search request, or a timeline summarization can be recommended to a user based on an identified interest of the user, e.g., identified based on express and/or implicit (e.g., observed user behavior such as and without limitation web page browsing, user searches, etc.) input from the user. Search tools such as those used by Tumblr® and Yahoo Mail allow a user to search for a timeline summarization using keyword query terms.

As shown in FIG. 8, internal architecture 800 of a computing device(s), computing system, computing platform, user devices, set-top box, smart TV and the like includes one or more processing units, processors, or processing cores, (also referred to herein as CPUs) 812, which interface with at least one computer bus 802. Also interfacing with computer bus 802 are computer-readable medium, or media, 806, network interface 814, memory 804, e.g., random access memory (RAM), run-time transient memory, read only memory (ROM), media disk drive interface 820 as an interface for a drive that can read and/or write to media including removable media such as floppy, CD-ROM, DVD, media, display interface 810 as interface for a monitor or other display device, keyboard interface 816 as interface for a keyboard, pointing device interface 818 as an interface for a mouse or other pointing device, and miscellaneous other interfaces not shown individually, such as parallel and serial port interfaces and a universal serial bus (USB) interface.

Memory 804 interfaces with computer bus 802 so as to provide information stored in memory 804 to CPU 812 during execution of software programs such as an operating system, application programs, device drivers, and software modules that comprise program code, and/or computer executable process steps, incorporating functionality described herein, e.g., one or more of process flows described herein. CPU 812 first loads computer executable process steps from storage, e.g., memory 804, computer readable storage medium/media 806, removable media drive, and/or other storage device. CPU 812 can then execute the stored process steps in order to execute the loaded computer-executable process steps. Stored data, e.g., data stored by a storage device, can be accessed by CPU 812 during the execution of computer-executable process steps.

Persistent storage, e.g., medium/media 806, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 828 typically provides information communication using transmission media through one or more networks to other devices that use or process the information. For example, network link 828 may provide a connection through local network 824 to a host computer 826 or to equipment operated by a Network or Internet Service Provider (ISP) 830. ISP equipment in turn provides data communication services through the public, worldwide packet-switching communication network of networks now commonly referred to as the Internet 832.

A computer called a server host 834 connected to the Internet 832 hosts a process that provides a service in response to information received over the Internet 832. For example, server host 834 hosts a process that provides information representing video data for presentation at display 810. It is contemplated that the components of system 800 can be deployed in various configurations within other computer systems, e.g., host and server.

At least some embodiments of the present disclosure are related to the use of computer system 800 for implementing some or all of the techniques described herein. According to one embodiment, those techniques are performed by computer system 800 in response to processing unit 812 executing one or more sequences of one or more processor instructions contained in memory 804. Such instructions, also called computer instructions, software and program code, may be read into memory 804 from another computer-readable medium 806 such as storage device or network link. Execution of the sequences of instructions contained in memory 804 causes processing unit 812 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 800. Computer system 800 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 802 as it is received, or may be stored in memory 804 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

The invention claimed is:

1. A method comprising:
receiving, at a computing device, a request from a social media service user for information about an entity;
identifying, via the computing device, a plurality of social media content items, the social media content item identification comprising searching a number of social media content item data stores for the plurality of social media content items containing information about the entity;
determining, via the computing device and using each social media content item of the plurality, a timeline of episodes, the determined timeline of episodes comprising a number of episodes, the determination of the timeline of episodes comprising using a combined modeling, determined using statistical machine modeling, of content of the plurality of social media content items in combination with temporal information of the plurality of social media content items, the determination of the timeline of episodes further comprising using the combined modeling in assigning a number of social media content items of the plurality of social media content items to each episode of the number of episodes in the timeline of episodes;
determining, via the computing device and for an episode in the timeline of episodes, a ranking of the number of social media content items assigned to the episode, the rank determination comprising determining a set of features for each social media content item of the number of social media content items and using statistical machine modeling to rank the social media content items of the number of social media content items assigned to the episode in the timeline of episodes;
automatically selecting, via the computing device and for the episode, a predetermined number of top-ranked social media content items from the number of social media content items assigned to the episode; and
automatically creating, via the computing device, a summarization of the timeline of episodes, the summarization of the timeline of episodes comprising a number of entries corresponding to the number of episodes in the timeline of episodes, an entry corresponding to an episode of the number of episodes comprising the content of the predetermined number of top-ranked social media content items automatically selected from the number of social media content items assigned to the episode of the number of episodes.

2. The method of claim 1, further comprising:
communicating, via the computing device, the summarization of the timeline of episodes over an electronic communications network for display on a device of the user.

3. The method of claim 1, wherein the statistical machine modeling used in the determination of the timeline of episodes comprises a Bayesian nonparametric model that models the content using a multinomial distribution and a Gamma distribution that is used in modeling the temporal information.

4. The method of claim 3, wherein the content of a social media content item comprises hashtag content and content other than hashtag content which are modeled separately using two multinomial distributions.

5. The method of claim 3, further comprising:
determining, via the computing device, a posterior distribution of the Bayesian nonparametric model using Gibbs Sampling.

6. The method of claim 5, the posterior distribution determination further comprising:
generating, via the computing device, a time series using the temporal information of the plurality of social media content items;
determining, via the computing device and the generated time series, a plurality of temporal bursts, each temporal burst of the plurality being an episode approximation; and
initializing, via the computing device, the Gibbs Sampling using the determined plurality of temporal bursts.

7. The method of claim 1, the rank determination further comprising:
determining, via the computing device and for the episode, the set of features for each social media content item, wherein the set of features comprising a number of temporal-based, content-based and popularity-based features.

8. The method of claim 7, the feature set determination further comprising:
determining, via the computing device and for the episode, a local temporal peak of the episode using the temporal information of the number of social media content items assigned to the episode; and
determining, via the computing device and for the episode, a temporal-based feature for a social media content item assigned to the episode, the temporal-based feature of the social media content item assigned to the episode being a difference between the temporal information of the social media content item and the determined local temporal peak of the episode.

9. The method of claim 7, the feature set determination further comprising:
determining, via the computing device and for the episode, a number of term frequency vectors corresponding to the number of social media content items assigned to the episode, the term frequency vector determination comprising using frequency-inverse document frequency (TF-IDF) and terms used in a social media content item assigned to the episode to determine the social media content item's term frequency vector;
determining, via the computing device and for the episode, a centroid vector of the episode using the number of term frequency vectors corresponding to the number of social media content items assigned to the episode; and
determining, via the computing device and for the episode, a content-based feature for a social media content item assigned to the episode, the content-based feature of the social media content item assigned to the episode being a difference between the term frequency vector determined for the social media content item and the centroid vector determined for the episode.

10. The method of claim 7, the feature set determination further comprising:

determining, via the computing device and for the episode, a content-based feature for a social media content item assigned to the episode, the content-based feature determination comprising detecting a language used in the content of the social media content item assigned to the episode.

11. The method of claim 7, the feature set determination further comprising:
determining, via the computing device and for the episode, a content-based feature for a social media content item assigned to the episode, the content-based feature determination comprising determining a length of the content of the social media content item assigned to the episode.

12. The method of claim 7, the feature set determination further comprising:
determining, via the computing device and for the episode, a popularity-based feature for a social media content item assigned to the episode, the popularity-based feature being based a normalization of a number of popularity measures.

13. The method of claim 12, the number of popularity measures comprising a number of replies to the social media content item, a number of reposts of the social media content item, a number of followers of an author of the social media content item, and a number of likes associated with the social media content item.

14. The method of claim 1, the automatic selection of a predetermined number of top-ranked social media content items from the number assigned to the episode, further comprising:
automatically selecting, via the computing device, the predetermined number of top-ranked social media content items from the number assigned to the episode using a Gradient Boosted Decision Tree machine learning algorithm.

15. A non-transitory computer-readable storage medium tangibly encoded with computer-executable instructions, that when executed by a processor associated with a computing device, performs a method comprising:
receiving a request from a social media service user for information about an entity;
identifying a plurality of social media content items, the social media content item identification comprising searching a number of social media content item data stores for the plurality of social media content items containing information about the entity;
determining, using each social media content item of the plurality, a timeline of episodes, the determined timeline of episodes comprising a number of episodes, the determination of the timeline of episodes comprising using a combined modeling, determined using statistical machine modeling, of content of the plurality of social media content items in combination with temporal information of the plurality of social media content items, the determination of the timeline of episodes further comprising using the combined modeling in assigning a number of social media content items of the plurality of social media content items to each episode of the number of episodes in the timeline of episodes;
determining, for an episode in the timeline of episodes, a ranking of the number of social media content items assigned to the episode, the rank determination comprising determining a set of features for each social media content item of the number of social media content items and using statistical machine modeling to rank the social media content items of the number of social media content items assigned to the episode in the timeline of episodes;
automatically selecting, for the episode, a predetermined number of top-ranked social media content items from the number of social media content items assigned to the episode; and
automatically creating a summarization of the timeline of episodes, the summarization of the timeline of episodes comprising a number of entries corresponding to the number of episodes in the timeline of episodes, an entry corresponding to an episode of the number of episodes comprising the content of the predetermined number of top-ranked social media content items automatically selected from the number of social media content items assigned to the episode of the number of episodes.

16. The non-transitory computer-readable storage medium of claim 15, wherein the statistical machine modeling used in the determination of the timeline of episodes comprises a Bayesian nonparametric model that models the content using a multinomial distribution and a Gamma distribution that is used in modeling the temporal information.

17. The non-transitory computer-readable storage medium of claim 16, wherein the content of a social media content item comprises hashtag content and content other than hashtag content which are modeled separately using two multinomial distributions.

18. The non-transitory computer-readable storage medium of claim 16, further comprising:
determining, via the computing device, a posterior distribution of the Bayesian nonparametric model using Gibbs Sampling.

19. The non-transitory computer-readable storage medium of claim 18, the posterior distribution determination further comprising:
generating, via the computing device, a time series using the temporal information of the plurality of social media content items;
determining, via the computing device and the generated time series, a plurality of temporal bursts, each temporal burst of the plurality being an episode approximation; and
initializing, via the computing device, the Gibbs Sampling using the determined plurality of temporal bursts.

20. A computing device comprising:
a processor;
a non-transitory storage medium for tangibly storing thereon program logic for execution by the processor, the program logic comprising:
receiving logic executed by the processor for receiving a request from a social media service user for information about an entity;
identifying logic executed by the processor for identifying a plurality of social media content items, the social media content item identification comprising searching a number of social media content item data stores for the plurality of social media content items containing information about the entity;
determining logic executed by the processor for determining, using each social media content item of the plurality, a timeline of episodes, the determined timeline of episodes comprising a number of episodes, in the timeline, the determination of the timeline of episodes comprising using a combined modeling, determined using statistical machine modeling, of content of the plurality of social media content items in combination with temporal information of the plurality of social media content items, the determination of the timeline of episodes further comprising using the combined modeling in assigning a number of social media content items of the plurality to each episode of the number of episodes in the timeline of episodes;

determining logic executed by the processor for determining, for an episode in the timeline of episodes, a ranking of the number of social media content items assigned to the episode, the rank determination comprising determining a set of features for each social media content item of the number of social media content items and using statistical machine modeling to rank the social media content items of the number of social media content items assigned to the episode in the timeline of episodes;

selecting logic executed by the processor for automatically selecting, for the episode, a predetermined number of top-ranked social media content items from the number of social media content items assigned to the episode; and creating logic executed by the processor for automatically creating a summarization of the timeline of episodes, the summarization of the timeline of episodes comprising a number of entries corresponding to the number of episodes in the timeline of episodes, an entry corresponding to an episode of the number of episodes comprising the content of the predetermined number of top-ranked social media content items automatically selected from the number of social media content items assigned to the episode of the number of episodes.

* * * * *